PATENTED SEP 26 1972　　　　　　　　　　　　　　　3,694,102

United States Patent
Conrad

[15] 3,694,102
[45] Sept. 26, 1972

[54] GUIDE BLADES OF AXIAL COMPRESSORS

[72] Inventor: Oswald Conrad, Schmiden, Wurttemberg, Germany

[73] Assignee: Daimber-Benz Aktiengesellschaft, Stuttgart-Unterturkheim, Germany

[22] Filed: July 7, 1970

[21] Appl. No.: 52,832

[30] Foreign Application Priority Data

July 26, 1969   Germany..........P 19 38 132.9

[52] U.S. Cl. .................415/115, 415/121, 415/168, 415/DIG. 1
[51] Int. Cl..............................................F01d 5/14
[58] Field of Search..........415/115, DIG. 1, 121, 168

[56] References Cited

UNITED STATES PATENTS

| | | | |
|---|---|---|---|
| 2,469,375 | 5/1949 | Flagle | 415/DIG. 1 |
| 2,989,848 | 6/1961 | Paiment | 415/115 |
| 2,597,510 | 5/1952 | McBride | 415/DIG. 1 |
| 2,637,487 | 5/1953 | Sawyer | 415/DIG. 1 |
| 2,720,356 | 10/1955 | Erwin | 415/DIG. 1 |
| 3,561,882 | 2/1971 | Somers et al. | 415/115 |

FOREIGN PATENTS OR APPLICATIONS

| | | | |
|---|---|---|---|
| 316,381 | 8/1929 | Great Britain | 415/168 |
| 343,407 | 2/1931 | Great Britain | 415/168 |
| 1,085,227 | 9/1967 | Great Britain | 415/DIG. 1 |

*Primary Examiner*—C. J. Husar
*Attorney*—Craig, Antonelli & Hill

[57] ABSTRACT

A guide blade arrangement of axial compressors in which the guide blades are provided with openings for sucking off the boundary layer, which are in communication by way of hollow spaces provided in the blades with a space of relatively low pressure.

21 Claims, 3 Drawing Figures

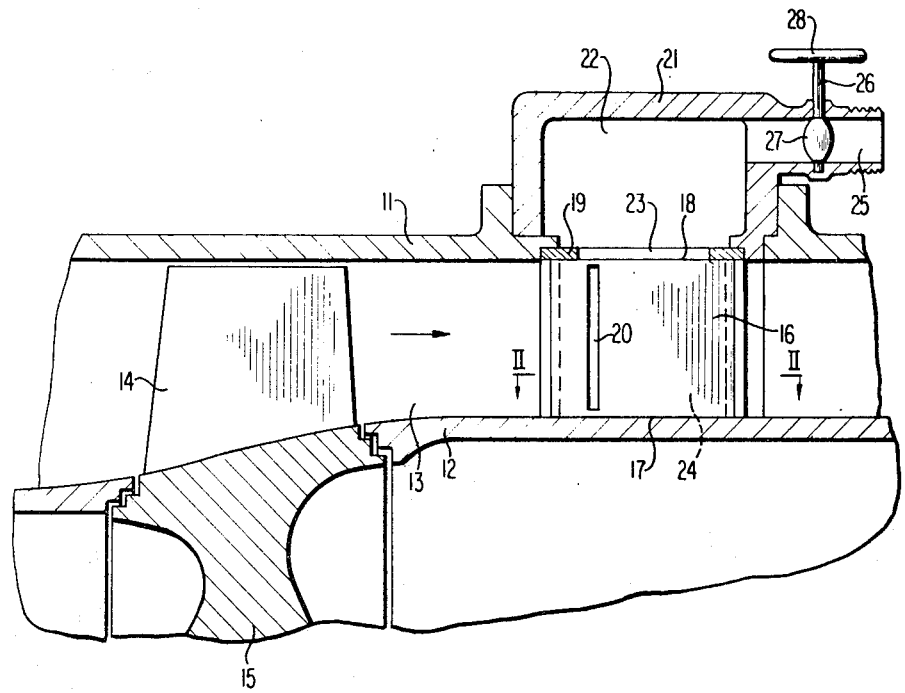

GUIDE BLADES OF AXIAL COMPRESSORS

The present invention relates to guide blades of axial compressors in which the danger exists at the side facing the flow that the flow separates which leads to the vortex or eddy formation and therewith to an increase of the resistance. It is the object of the present invention to prevent such flow losses in a simple manner. This is realized according to the present invention in that the guide blades are provided with openings for sucking off the boundary layer, which are in communication by way of hollow spaces in the blades with a space of low pressure. As a result of the pressure drop created thereby between the guide blade surfaces and the space connected with the same, the boundary layer is drawn off and a laminar flow about the guide blades is achieved.

Openings in the profile of circumcirculated bodies for sucking off the boundary layer are known already in the prior art. With rotor blades of compressors it has already been proposed to draw off the boundary layer through radial channels or ducts, which start in openings in the blade, by the effect of the centrifugal force and to centrifuge off the air into the gap between the rotor and housing. However, such a measure is not applicable to fixed guide blades.

The danger of flow separation is particularly large if the blades encounter a flow with supersonic velocity. The compression shock resulting therefrom directly upstream of the blades causes a sudden strong pressure increase at the impact place which leads to a separation of the flow. This is counteracted effectively by the present invention in that the suction openings are arranged on the side of the guide blades facing the flow within an area which is disposed substantially opposite the leading edge of the adjacent blade. The suction openings are disposed with this arrangement within the area of the impact line of the compression shock, which enables an effective removal by suction of the boundary layer. It is thereby particularly favorable according to a further feature of the present invention if corresponding to the impact line of the compression shock, a gap is utilized as suction opening of a respective guide blade.

Accordingly, it is an object of the present invention to provide a guide blading of axial compressors which avoids by simple means the aforementioned shortcomings and drawbacks encountered heretofore.

Another object of the present invention resides in a guide blade structure for axial compressors which effectively eliminates the danger of change from laminar to non-laminar flow.

A further object of the present invention resides in a guide blade structure of axial compressors which reduces the danger of increase of resistance due to vortex formation by an effective suction removal of the boundary layer.

These and further objects, features and advantages of the present invention will become more obvious from the following description when taken in connection with the accompanying drawing which shows, for purposes of illustration only, two embodiments in accordance with the present invention, and wherein.

Figure 1:
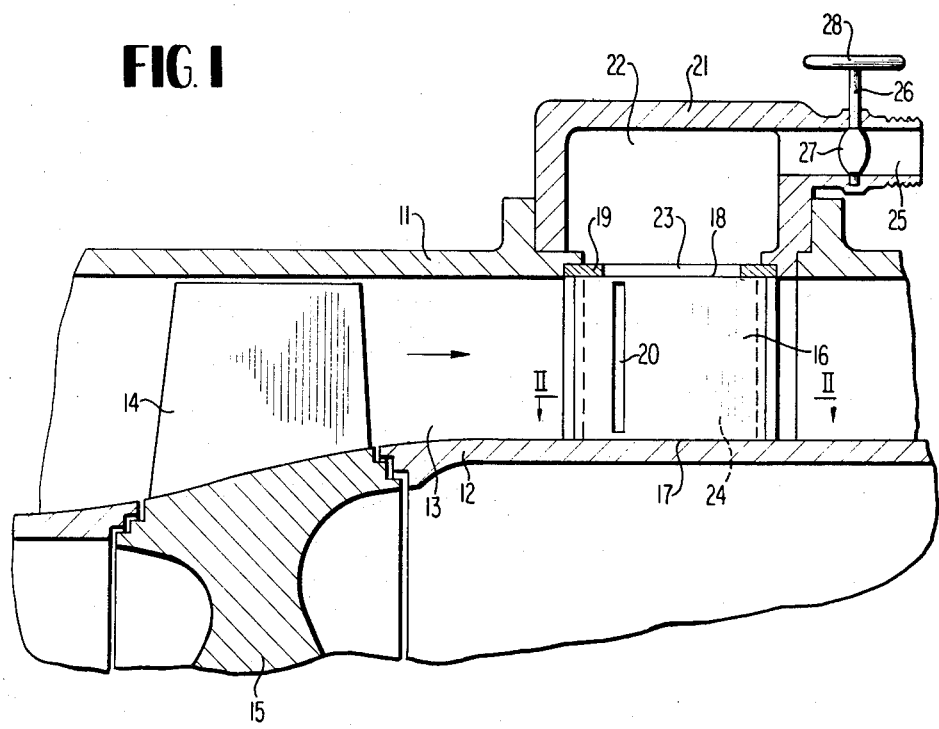
FIG. 1 is a partial longitudinal cross-sectional view through an axial compressor in accordance with the present invention.

Referring now to the drawing wherein like reference numerals are used throughout the various views to designate like parts, and more particularly to FIG. 1, the external wall 11 of an axial compressor of a jet turbine engine forms together with an inner wall 12 an annular channel or duct 13 into which project the rotor vanes or blades 14 of a rotor 15 of a compressor stage. The guide blades 16 abut with their inner end faces 17 at the inner wall 12 and with their outer end faces 18 at a ring 19 which replaces the outer wall 11 within this area. The guide blades 16 are hollow and are provided each with a gap 20 at the side thereof facing the flow direction indicated by an arrow. A housing ring 21 forms together with the ring 19 a collecting space 22 which, on the one hand, is in communication by way of apertures 23 in the ring 19 with the interior space 24 of the hollow guide blades 16 and, on the other, by way of a pipe 25 with a place of low pressure. In the pipe 25 a throttle valve 27 is secured on a shaft 26 which is adjusted by means of a wheel 28.

The pipe 25 may be connected, for example, with the suction side of a compressor stage of a lower pressure or may lead simply into the atmosphere. As a result thereof, air is sucked off through the gap 20 into the interior space 24 of the guide blades 16 as well as through the collecting space 22. The quantity of the sucked-off air can be determined by the adjustment of the throttle valve 27. For that purpose, the wheel 28 is rotated, for example, by means of an electric motor.

Figure 2:
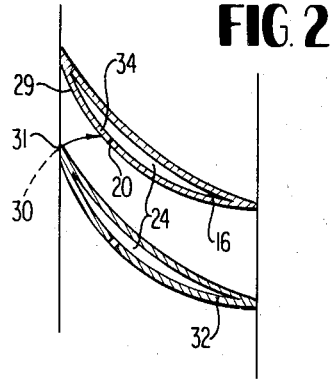
FIG. 2 is a partial cross-sectional view taken along line II—II of FIG. 1 and illustrating the guide blades in the unfolded condition.

The removal by suction of the boundary layer through the gap 20 leads to an abutment of the flow at the profile 29, shown in FIG. 2, of the guide blade 16 and prevents thereby the formation of harmful eddies or vorteces. With flow velocities that are in the supersonic range, a compression shock which is indicated by an arrow 30 in FIG. 2, acts on the guide blades 16. The gap 20 which is arranged approximately opposite the leading edge 31 of the next-adjacent guide blade 32, is disposed directly behind or downstream of the impact place 34 of the compression shock and results therewith in an effective removal by suction of the boundary layer. A separation of the flow and the flow losses connected therewith are avoided by such arrangement.

Figure 3:
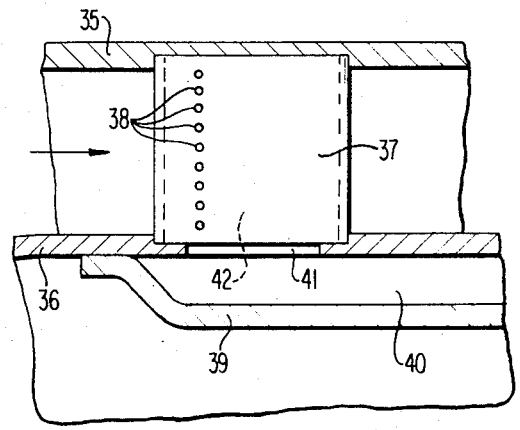
FIG. 3 is a partial longitudinal cross-sectional view through a modified embodiment of an axial compressor in accordance with the present invention.

Another possibility to remove by suction air out of the boundary layer of guide blades is illustrated in FIG. 3. In this embodiment, guide blades 37 inserted between an outer wall 35 and an inner wall 36 are provided with a row of apertures 38 on the side facing the flow. The inner wall 36 forms together with a housing ring 39 an annularly shaped collecting space 40 which is connected by way of apertures 41 with the interior spaces 42 of the hollow guide blades 37 and therewith with the series of apertures 38. The collecting space 40 is in communication, for example, by way of hollow ribs or a hollow shaft, with a space of low pressure. The boundary layer of the guide blades 37 is sucked off in this embodiment in each case by way of the row of apertures 38. The operation corresponds to that of the embodiment illustrated in FIGS. 1 and 2.

While I have shown and described only two embodiments in accordance with the present invention, it is understood that the same is not limited thereto but is susceptible of numerous changes and modifications. For example, it is also possible to remove by suction, air out of the interior space of the hollow guide blades simultaneously through openings in the outer and the inner end faces of the guide blades. This may be particularly advantageous if in connection with slender guide blades relatively large amounts of air have to be sucked off. The area in which the suction apertures are arranged may extend from a place disposed directly opposite of a leading edge of the next-adjacent blade in the flow direction up to a place remote therefrom by about a channel width. Instead of a gap or of a row of openings, also a large number of pore-shaped apertures in the guide blades may be utilized. In addition thereto, many other shapes of apertures and combinations are possible within the scope of the present invention, as known to those skilled in the art.

Hence, I do not wish to be limited to the details shown and described herein but intend to cover all such changes and modifications as are encompassed by the scope of the appended claims.

What I claim is:

1. A guide blade structure for axial compressors comprising: guide blades having leading edges facing the flow of gaseous fluid through the compressor, and suction aperture means arranged in the guide blades downstream of their respective leading edges for the removal by suction of the gaseous boundary layer to decrease the resultant drag on the guide blades, said aperture means being in communication with a space of relatively low pressure by way of hollow spaces in the blades.

2. A guide blade structure according to claim 1, characterized in that the suction aperture means are arranged on the side of the guide blades facing the flow within an area that is disposed substantially opposite the leading edge of the adjacent blade.

3. A guide blade structure according to claim 1, characterized in that a gap forms the suction aperture means of a respective guide blade.

4. A guide blade structure according to claim 1, characterized in that the outer end faces of the guide blades terminate in a collecting space surrounding the compressor housing.

5. A guide blade structure according to claim 4, characterized in that the discharge cross section of the collecting space in communication with the guide blades is adjustable.

6. A guide blade structure according to claim 1, characterized in that the inner end faces of the guide blades terminate in an inner collecting space.

7. A guide blade structure according to claim 6, characterized in that the discharge cross section of the collecting space in communication with the guide blades is adjustable.

8. A guide blade structure according to claim 1, characterized in that a row of apertures serves as suction aperture means of a respective guide blade.

9. A guide blade structure according to claim 1, characterized in that the hollow spaces in the guide blades are in communication with collecting spaces disposed radially outwardly and radially inwardly thereof through which the boundary layer is sucked off.

10. A guide blade structure according to claim 1, characterized in that the suction aperture means are arranged within an area that extends from a place disposed directly opposite the leading edge of the adjacent blade in the flow direction up to a place removed therefrom by approximately a channel width.

11. A guide blade structure according to claim 2, characterized in that at least one of the inner and outer end faces of the guide blades terminate in a collecting space.

12. A guide blade structure according to claim 11, characterized in that the discharge cross section of the collecting space in communication with the guide blades is adjustable.

13. A guide blade structure according to claim 11, characterized in that a gap forms the suction aperture means of a respective guide blade.

14. A guide blade structure according to claim 11, characterized in that a row of apertures serves as suction aperture means of a respective guide blade.

15. A guide blade structure according to claim 11, characterized in that pore-like openings in the guide blades serve as suction aperture means.

16. A guide blade structure of axial compressors comprising guide blades provided with suction aperture means for the removal by suction of the gaseous boundary layer, said aperture means being in communication with a space of relatively low pressure by way of hollow spaces in the blades, at least one of the inner and outer end faces of the guide blades terminating in a collecting space, characterized in that the suction aperture means are arranged within an area that extends from a place disposed directly opposite the leading edge of the adjacent blade in the flow direction up to a place removed therefrom by approximately a channel width.

17. A blade arrangement for axial compressor comprising at least one set of rotatable rotor blades, a set of relatively fixed guide blades arranged downstream of the set of rotor blades for guiding gaseous fluid leaving the rotor blades, each of said guide blades having a leading edge facing the flow of gaseous fluid from the rotor blades and inner and outer ends connected to respective inner and outer walls of said compressor, and suction aperture means arranged in the guide blades downstream of their respective leading edges for the removal by suction of the gaseous boundary layer to decrease the resultant drag on the guide blades, said aperture means being in communication with a space of relatively low pressure by way of hollow spaces in the blades.

18. An arrangement according to claim 17, characterized in that suction aperture means are arranged on the side of the guide blades facing the flow within an area that is disposed substantially opposite the leading edge of the adjacent blade.

19. An arrangement according to claim 18, characterized in that, for conditions of supersonic flow into the guide blades, the aperture means are arranged downstream of the impingement line of the compression shock wave attached to the next adjacent blade.

20. An arrangement according to claim 17, characterized in that at least one of the inner and outer ends of the guide blades terminate in a collecting space surrounding the compressor housing, and in that the discharge cross-section of the collecting space in communication with the guide blades is adjustable.

21. An arrangement according to claim 17, characterized in that the suction aperture means are arranged within an area that extends from a place disposed directly opposite the leading edge of the adjacent blade in the flow direction to a place removed therefrom by approximately the width of the channel formed by the inner and outer walls adjacent the guide blades.

* * * * *